(12) United States Patent
Larssen et al.

(10) Patent No.: US 8,469,315 B2
(45) Date of Patent: Jun. 25, 2013

(54) DEPLOYABLE FLAP EDGE FENCE

(75) Inventors: Jon V. Larssen, Seattle, WA (US);
Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 12/764,253

(22) Filed: Apr. 21, 2010

(65) Prior Publication Data
US 2010/0219288 A1 Sep. 2, 2010

Related U.S. Application Data

(62) Division of application No. 11/741,713, filed on Apr. 27, 2007, now Pat. No. 7,753,316.

(51) Int. Cl.
*B64C 23/06* (2006.01)

(52) U.S. Cl.
USPC ................................ 244/199.4; 244/204.1

(58) Field of Classification Search
USPC .................. 244/199.1–199.4, 201.1, 204
See application file for complete search history.

(56) References Cited

U.S. PATENT DOCUMENTS

| | | | | |
|---|---|---|---|---|
| 4,017,041 A | * | 4/1977 | Nelson | 244/198 |
| 4,457,479 A | * | 7/1984 | Daude | 244/203 |
| 4,477,042 A | * | 10/1984 | Griswold, II | 244/199.2 |
| 5,209,438 A | * | 5/1993 | Wygnanski | 244/203 |
| 5,253,828 A | * | 10/1993 | Cox | 244/200.1 |
| 5,738,298 A | | 4/1998 | Ross et al. | |
| 5,749,546 A | | 5/1998 | Blackner et al. | |
| 5,752,672 A | * | 5/1998 | McKillip, Jr. | 244/99.8 |
| 6,065,934 A | * | 5/2000 | Jacot et al. | 416/155 |
| 6,322,324 B1 | * | 11/2001 | Kennedy et al. | 416/1 |
| 6,394,397 B1 | * | 5/2002 | Ngo et al. | 244/199.3 |
| 6,427,948 B1 | * | 8/2002 | Campbell | 244/204.1 |
| 6,454,219 B1 | | 9/2002 | Moe | |
| 6,491,260 B2 | * | 12/2002 | Borchers et al. | 244/199.1 |

FOREIGN PATENT DOCUMENTS

WO WO2008134193 A1 11/2008

OTHER PUBLICATIONS

Horne, W. Clifton, et al; "Measurements of Unsteady Pressure Fluctuations on the Surface of an Unswept, Multi-element airfoil." AIAA, CEAS Aeroacoustics Confereance, Atlanat, US, May 12, 1997, pp. 481-492.
Dobrzynski, W., et al; "Model and full scale high-lift wind tunnel experiments dedicated to airframe noise reduction." Aerospace Sci. Technology, vol. 5, No. 2001, Sep. 29, 2000, pp. 27-33.

\* cited by examiner

*Primary Examiner* — Tien Dinh
(74) *Attorney, Agent, or Firm* — Parsons Behle & Latimer

(57) ABSTRACT

A method and systems are disclosed for reducing fluid flow noise. The method and systems use a thermal mechanism to deploy a flap edge fence during landing and/or other operating conditions, and stow the flap edge fence during other operational conditions such as cruise. The flap edge fence is controlled passively by ambient temperature or actively by a controller based on temperature changes corresponding to various operating conditions.

10 Claims, 6 Drawing Sheets

FIG. 1-EXISTING ART

FIG. 2-EXISTING ART

FIG. 3 -EXISTING ART

DEPLOYABLE FLAP EDGE FENCE

This is a Divisional of a co-pending application Ser. No. 11/741,713, filed on Apr. 27, 2007.

TECHNICAL FIELD

Embodiments of the present disclosure relate generally to reducing noise produced by fluid dynamic surfaces moving in a fluid. More particularly, embodiments of the present disclosure relate to a deployable flap edge fence for an aircraft for reducing airflow noise (aerosound) produced by a flap edge when it is exposed to the fluid (e.g. air) during certain flight conditions.

BACKGROUND

An airplane's airframe and engines produce varying amounts of objectionable audible noise during different flight conditions. During departure, the engines produce most of the noise; however, during approach, airframe noise is a much greater factor. Airframe noise is generated by air flowing over the airplane's fuselage, landing gear, wing leading and trailing edges equipped with high-lift devices and flap systems. On the approach to landing, high lift systems, such as wing leading edge devices and wing trailing edge flap systems, are extended and the engines are operated at low thrust levels. Accordingly, the most audible noise produced by flap systems occurs on approach when the flaps are extended and lateral flap edges are exposed. Furthermore, recent advances in technology have reduced engine noise significantly during all flight conditions. Therefore, airframe noise has become a more dominant source of aerosound, and particularly so for an airplane during approach to landing.

Figure 1:
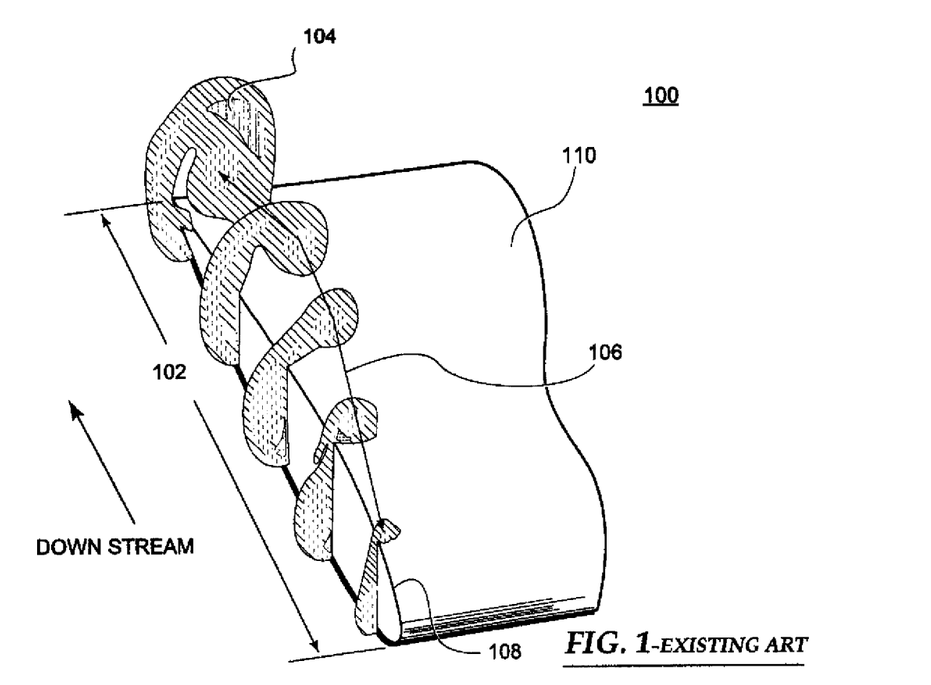
FIG. 1 is an existing art diagram that illustrates a shear layer emanating around a sharp flap edge and which evolves into a vortex core.

One of the main noise-generating mechanisms at play in flap edge flows can be attributed to shear layer fluctuations and their interaction with surrounding edges and surfaces. When an airfoil creates lift, the inherent pressure differences between the top and bottom surfaces cause air to leak around the edges of the airfoil in an attempt to equalize the pressure. Since flap edges are usually sharp, this results in a separated shear layer emanating from the bottom side of the airfoil. Similarly another vortex emerges from the sharp junction between the side edge 108 and the upper surface of the flap 110. As shown in FIG. 1, this occurs throughout the chordlength 102, and the shear layer rolls up (reference number 104 represents this roll up effect) into a vortex core 106 which is transported downstream. These two vortex systems dither around the surrounding surfaces, emitting broadband noise. At some angle-of-attack dependent chord-wise location, the lower vortex core will spill over the sharp top surface edge 108 creating additional broadband noise.

Figure 2:
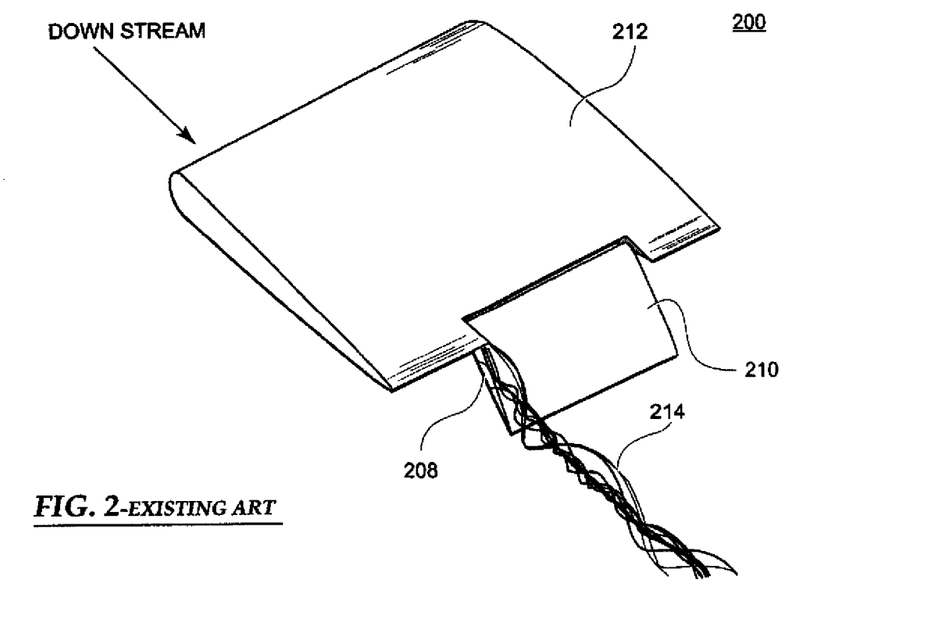
FIG. 2 is an existing art illustrating a schematic top plan view of part of a wing showing lower and upper surface vortex cores entraining each other to form a high-intensity vortex core.

After spilling over the sharp edge 108, the lower surface vortex core interacts with the upper surface vortex. As shown in FIG. 2, the two vortex-systems then entrain each other and develop into a high-intensity tightly formed vortex core 214 which can be detrimental for airplanes crossing the wake further downstream In the past, various approaches have been taken to attenuate the vortices produced by flaps and other lifting surfaces. Flap edge fences have been proposed as a way to mitigate the noise source emerging from the flap edges. As will be explained in more detail below, a general flap edge fence (not shown in FIG. 2) forms a barrier that modifies and displaces the flap tip vortex system 214 leaving the flap edge 208.

One of the problems facing the successful installation of such a flap edge fence is that, while highly beneficial with a fully extended flap trailing edge, the fences are far from optimal in high-speed cruise conditions. Mounted perpendicularly to the deployed flap trailing edge, the fence may form a significant angle to the local air-flow when the flap trailing edge is stowed due to Fowler motion and inherent cross flow of any three-dimensional wing. This would result in wasted lifting forces and additional drag, which in turn creates unnecessary loads on the structure. Any such additional drag in cruise should be kept to a minimum for efficient operation. Currently, existing flap edge fences are fixed and no alternatives are available.

To minimize aerosound due to the extension of flaps during aircraft operations and, more specifically, to reduce drag during high-speed cruise conditions, it is desirable to have a deployable flap edge fence so that any additional drag in cruise is kept to a minimum for efficient operation. Other desirable features and characteristics of embodiments of the present invention will become apparent from the subsequent detailed description and the appended claims, taken in conjunction with the accompanying drawings and the foregoing technical field and background.

BRIEF SUMMARY

A method and systems for reducing fluid flow noise using a deployable flap edge fence are proposed. The method shapes the deployable flap edge fence in response to a temperature change. In this regard, the method reduces airflow noise by thermally activating a deployable flap edge fence for approach and landing. With the flap edge fence deployed, tip-leakage vortices generated at the trailing edge of a flap are prevented from directly rolling over from the lower surface of the flap to the upper surface of the flap. The method also reduces drag by stowing the deployable flap edge fence for cruise thereby reducing interaction of the deployable flap edge fence with local air-flow over the body.

A first embodiment includes: a flap coupled to a wing main element and a reconfigurable flap edge fence coupled to the flap. A control mechanism deploys the flap edge fence for a first set of flight conditions (e.g. approach and landing), and stows the flap edge fence for a second set of flight conditions (e.g. cruise) in response to a temperature change.

A second embodiment employs a trained shaped memory alloy (SMA) torque tube to thermally stow or deploy the reconfigurable flap edge fence. In this regard, the second embodiment includes: a flap coupled to the wing main element, a flap edge fence coupled to the flap, a trained SMA torque tube coupled to the flap edge fence and the flap, and configured to position (deploy, or stow away) the flap edge fence in response to a temperature change. A controller is coupled to the trained SMA torque tube to thermally activate the trained SMA torque tube at occurrence of a first temperature range (corresponding to approach and landing altitudes). The thermal activation drives the SMA torque tube towards an austenitic trained shape thereby generating a moment between the flap edge fence and the flap with sufficient torque to deploy the flap edge fence. The SMA torque tube deactivates at a second temperature range (corresponding to cruise altitudes) by returning to its martensite shape which produces a torque moment that stows the reconfigurable flap edge fence onto the flap for cruise. In this regard, the controller monitors the temperature of the SMA torque tube and provides the temperature change by heating/cooling of the SMA torque tube as needed based on a flight condition. Alternatively, thermal activation can also be passively provided by ambient temperature corresponding to an altitude at the flight condition.

A third embodiment uses a bending flexure flap edge fence made from SMA material to thermally deploy, stow away, or change orientation to align with the flow. In this regard, the third embodiment includes: a flap coupled to the wing main element, and an SMA reconfigurable/deployable flap edge fence coupled to the flap and configured to deploy and stow in response to temperature change. This adaptation is in response to a temperature change and is accomplished by thermally deploying the SMA flap edge fence to a predetermined bending angle for a first set of flight conditions, and thermally stowing the SMA flap edge fence along the streamlines of the local air flow for a second set of flight conditions. The thermal condition may be provided actively by a controller (using aircraft systems), or alternatively, the temperate change may be provided passively by changes in ambient temperature.

A further embodiment includes an adaptive fluid dynamic system for reducing drag/fluid noise due to fluid flow. The system includes: a body capable of generating lift by moving through a fluid, and a deployable body edge fence coupled to the body. A control mechanism is used to reconfigure the body edge fence into a deployed state for a first set of operating conditions, and to reconfigure the body edge fence again into a stowed state for a second set of operating conditions.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present disclosure may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the disclosure nor the application and uses of such embodiments. Furthermore, there is no intention to be bound by any expressed or implied theory presented in the preceding technical field, background, brief summary or the following detailed description.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, aircraft control systems, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems and aircraft wing configurations, and that the system described herein is merely one example embodiment of the disclosure.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 4-11 depict example arrangements of elements, additional intervening elements, devices, features, or components may be present in an embodiment of the disclosure.

A wing is a surface used to produce lift and therefore flight, for travel in air or another medium. An example of an application in another medium is a hydrofoil wing in water. The wing sectional shape is usually an airfoil with a large lift-to-drag ratio. A common use for a wing is in flight, using forward motion to create vertical lift, but wings are also used to produce downward force holding racing cars on the ground. Furthermore, a sail boat moves by using sails and a keel like a vertical wing to produce lift in the horizontal plane. In this regard, although example embodiments described herein are in terms of the common use in flight, the embodiments of the disclosures are also applicable, without limitation, to a body capable of generating lift by moving through a fluid, as utilized in sail boats, hydrofoils, racing cars and the like.

Figure 3:
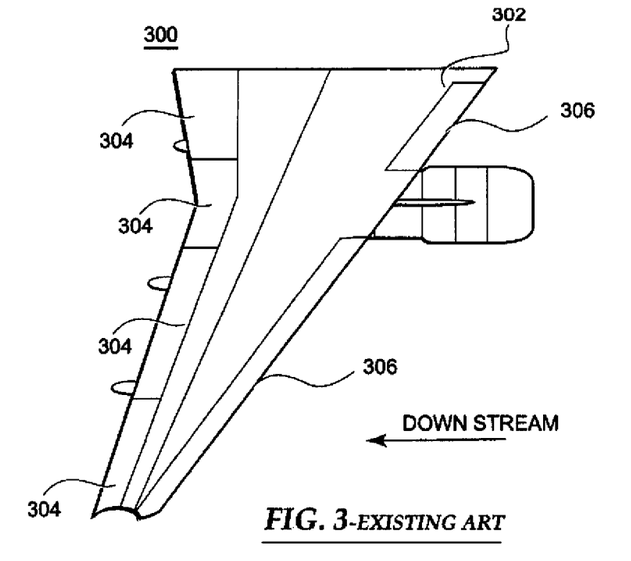
FIG. 3 is an existing art illustrating a top view of a portion of an aircraft wing showing a plurality of flaps and slats to which a plurality of deployable flap edge fences may be mounted.

FIG. 3 is an existing art illustration showing a schematic top view of an aircraft wing 300 having a wing main element 302, a plurality of flaps 304, and leading edge devices 306 (e.g., slats). For this embodiment, a plurality of deployable flap edge fences may be mounted on the flaps 304 or the leading edge devices 306. Details of deployable fences and how they relate to other aerodynamic surfaces are not shown in FIG. 3.

Flaps 304 are aerodynamic surfaces attached to the trailing edge of the wing main element 302. When deployed, the flaps 304 increase the lift (and drag) of the wing main element 302. The flaps 304 are usually fully extended while landing to allow the aircraft to fly slower (by increasing the lift generated by the wings at low speeds) and to steepen the approach to the landing site. Depending on the aircraft type, configuration and method of takeoff (e.g., short field, soft field, normal, etc.), flaps 304 are often partially extended for take-off to give the aircraft more lift when trying to leave the ground. During landing, the flaps 304 are usually fully extended, and significant airframe noise would be generated by the flap edges unless they are fitted with fences or any other successfully implemented noise mitigation device.

Slats 306 are aerodynamic surfaces attached to the leading edge of the wing main element 302, which, when deployed, allow the wing main element 302 to operate at a higher angle of attack. By deploying slats 306, the angle of attack at which stall occurs is increased. Slats 306 are usually used while landing or performing maneuvers which take the aircraft close to stall, but are usually retracted in normal flight to minimize drag. For example, during takeoff, the slats 306 are partially extended to provide attached flow over the wing main element 302 at high angles of attack. Shortly after take-off the slats 306 would be retracted to improve the lift-to-drag ratio of the climbout configuration. Similar to flaps 304, when slats 306 are fully/partially extended, aerodynamic noise could be generated at the slat without the presence of slat edge fences or another successfully implemented noise mitigation device.

Figure 4:
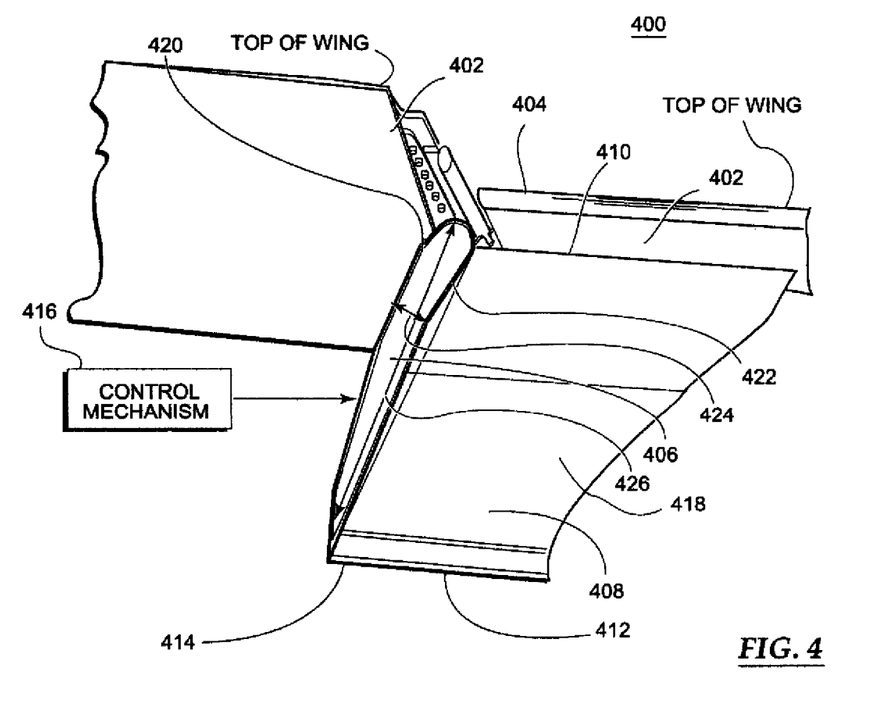
FIG. 4 is a perspective top view of a system for reducing airflow noise for an aircraft showing a relatively small flap edge fence mounted and deployed on the suction side of a flap.

FIG. 4 is a perspective top view of an example embodiment of a system 400, for reducing airflow noise for an aircraft. In the example embodiment shown in FIG. 4, the system 400 may include, without limitation: a wing main element 402, a flap 408 coupled to the wing main element 402, a deployable flap edge fence 406 coupled to the flap 408, and a control mechanism 416.

Wing main element 402 is the main part of an aircraft wing as explained in FIG. 3 above. Wing main element 402 includes a trailing edge 404 and a leading edge (not shown in FIG. 4). The flap 408 is usually coupled to the trailing edge 404.

Flap 408 includes a leading edge 410, a trailing edge 412, a tip 414, an upper surface 418 and a lower surface (not shown in FIG. 4). The flap 408 is a moveable surface mounted on the trailing edge 404 of the wing main element 402. As shown in FIG. 4, the flap 408 is deflected down to increase the effective curvature of the wing 300 (see FIG. 3), to produce additional lift, and to reduce the stalling speed of the wing 300. Flap 408 is used during low speed, high angle of attack flights like descent for landing.

Flap edge fence 406 is suitably configured to form a barrier that closes (or significantly closes) the gap (not shown in FIG. 4) between the wing main element 402 and the flap 408. In the example embodiment of FIG. 4, the flap edge fence 406 has an upper contour 420, a lower contour 422, a thickness 424, and a length 426, and the flap edge fence 406 is mounted (perpendicularly when deployed) on the suction side 418 (top surface) of the flap 408. For this embodiment, the lower contour 422 is attached chordwise to the tip 414 of the flap 408, and the upper contour 420 is substantially parallel to the flap 408 and matches the contour of the flap 408. The length 426 may extend from the leading edge 410 to the trailing edge 412 of flap 408. The upper contour 420, lower contour 422, thickness 424, and length 426 can vary according to various considerations, for instance, the type of high-lift device such as the wing 200 and the gap between the wing main element 402 and the flap 408. The flap edge fence 406 may be secured to the tip 414 of the flap 408 by any suitable technique or technology, for example, the flap edge fence 406 may be riveted, welded, or bolted chordwise to tip 414 of the flap 408. While the flap edge fence 406 is described as being mounted perpendicularly (when deployed), various other configurations may also be used, for example, a configuration that is canted outward from the vertical to conform with air flow.

Figure 5:
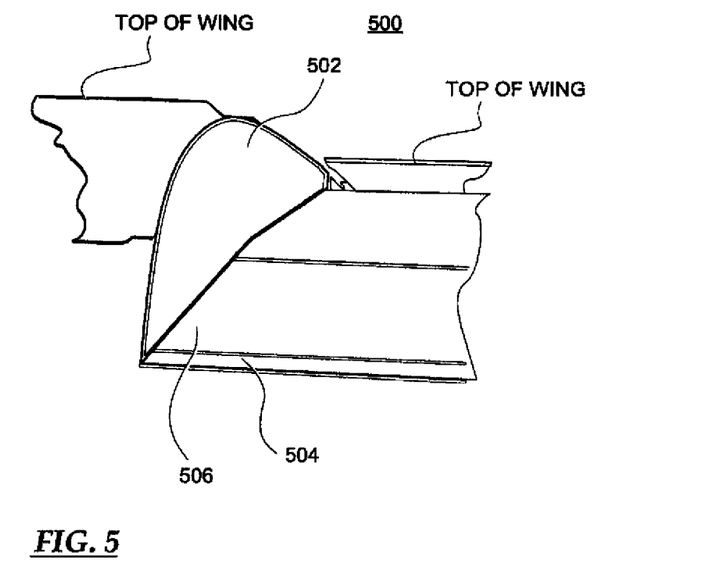
FIG. 5 is a perspective top view of a system for reducing airflow noise for an aircraft showing a relatively large size flap edge fence mounted and deployed on the suction side of a flap.

Although FIG. 4 shows a relatively small flap edge fence 406, generally the flap edge fence 406 may have, without limitation, the same size and/or aerodynamic shape as the flap 408, a flat thin plate, or the like that is suitable for stowing and deployment according to embodiments of this disclosure. This facilitates closing of the gap between the wing main element 402 and the flap 408. For example, as shown in FIG. 5, a relatively large deployable flap edge fence 502 as compared to flap edge fence 406 may be mounted on the suction side 506 (upper surface) of the flap 504.

Figure 6:
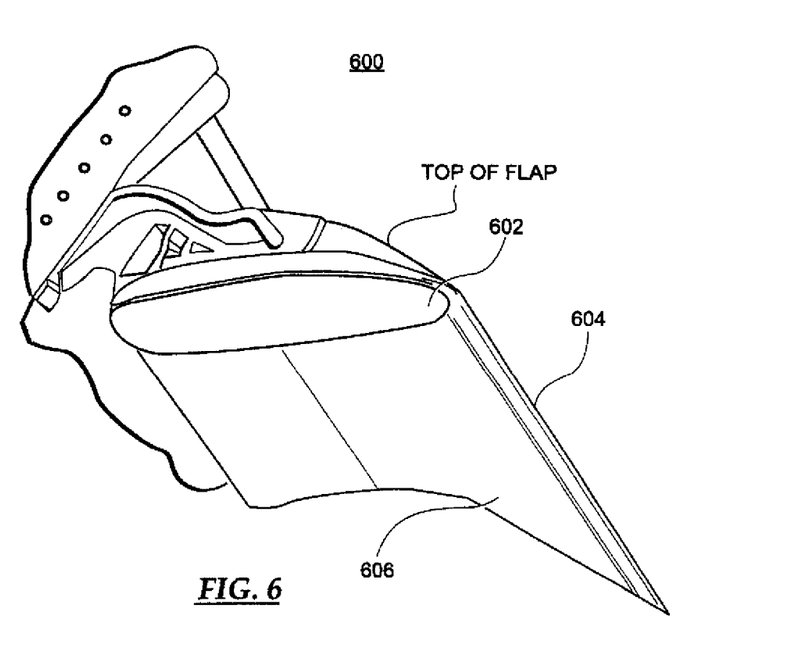
FIG. 6 is a perspective bottom view of a system for reducing airflow noise for an aircraft, showing another flap edge fence mounted and deployed on the pressure side of a flap.

Alternatively or additionally, the deployable flap edge fences may be mounted on the flap lower surface (pressure side) of the flap. For example, as shown in FIG. 6, a reconfigurable flap edge fence 602 may be mounted on the pressure side 606 (lower surface) of the flap 604. Flap edge fences may also be mounted on both lower and upper surfaces of the flap (not shown in FIG. 6).

Flap edge fences installed on the pressure, suction or both sides of the flap airfoil attempt to alleviate the noise by increasing the distance between the two vortex cores. Increasing the distance between the two vortex cores increases the characteristic timescales associated with the unsteady vortex motion, which lowers the characteristic frequency range away from effective perceived noise level sensitive frequencies. Flap edge fences also alleviate the noise by moving the vortex cores away from sharp edges and the upper surface (suction side fence) to reduce interaction associated noise. Flap edge fences have previously shown significant potential in reducing airframe noise, particularly for medium sized commercial aircraft. This effectively results in an overall lower noise signature, especially upon approach where airframe noise is dominant over a significant portion of the flyover. An additional potential benefit of flap edge fences is slightly increased lift and less induced drag resulting in a small but measurable increase in the lift-to-drag ratio during landing.

Fixed flap edge fences cannot be selectively stowed during cruise (and deployed during approach). Consequently, such fixed flap edge fences may result in a significant pressure drag penalty due to interaction between the fixed flap edge fence and local air-flow over the wing main element as well as additional skin friction drag from the extra wetted surface area. In contrast, the deployable flap edge fences 406/502/602 are suitably configured to reduce airflow noise, while minimizing additional drag during aircraft operations and, more specifically, during high speed cruise. During cruise, the flap edge fence can be streamlined to minimize drag. Another, perhaps even more effective option is for the flap edge fence to be hinged, allowing it to be stowed flat against the flap surface when not deployed. For example, in an embodiment a flap edge fence in a stowed position has a smooth aerodynamic surface that is flush with the surface of the flap. Upon approach, the flap edge fence would deploy into the position required to effectively shield the flap edge vortex from rolling over to the suction side (upper surface) of the flap. In this regard, the flap edge fence 406 may be passively reconfigured using the ambient temperature change with altitude, or a control mechanism can be utilized to actively reconfigure the flap edge fence 406 for various flight conditions.

Referring again to FIG. 4, control mechanism 416 is configured to control the deployment of the flap edge fence 406 for a first set of flight conditions (such as landing and approach) to reduce the airflow noise. As mentioned above, the airflow noise is minimized by preventing tip-leakage vortices, generated at the trailing edge 412, from rolling over from the lower surface to the upper surface of the flap (see FIG. 1). The control mechanism 416 also controls the stowing of the deployable flap edge fence for a second set of flight conditions (such as cruise) to minimize extra drag by preventing the flap edge fence 406 from interacting with the local air-flow over the wing main element 302 (See FIG. 3). The control mechanism 416 may include or be realized as a controller (connected to the aircraft systems), as explained below in the context of FIG. 7 to facilitate changing the shape of the flap edge fence 406.

Figures 7, 8:
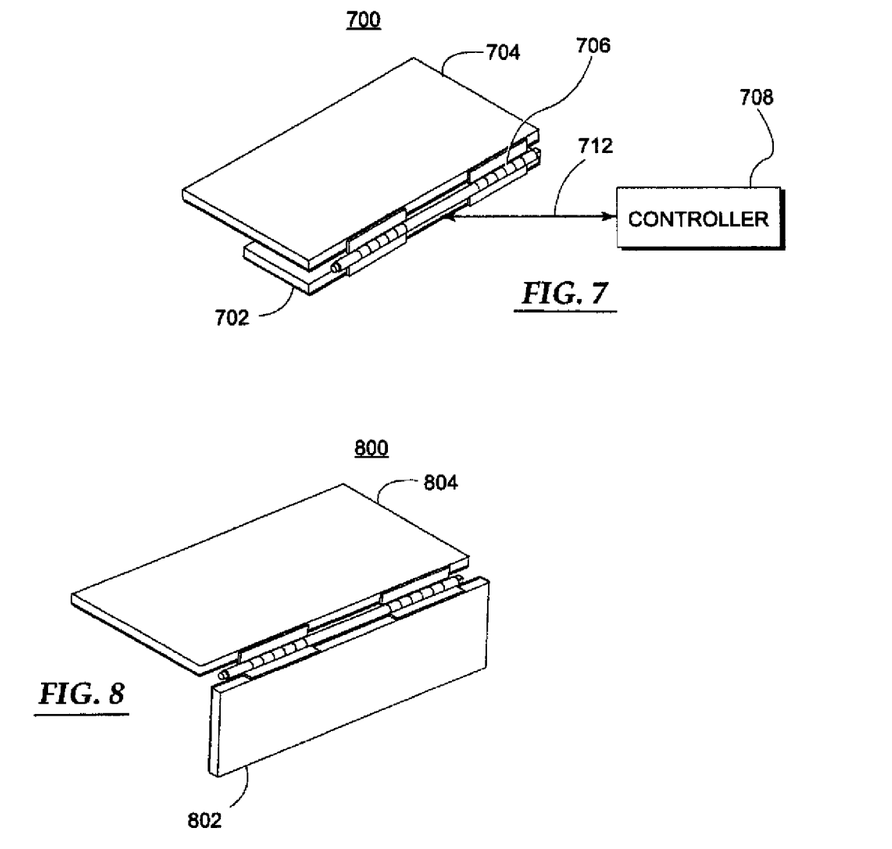
FIG. 7 is a perspective view that illustrates a flap edge fence model stowed via an SMA torque tube employing a controller.
FIG. 8 is a perspective view that illustrates a flap edge fence model deployed via an SMA torque tube.

FIG. 7 is a perspective view of another example embodiment of a system 700 for reducing airflow noise for an aircraft employing an active control mechanism (controller). FIG. 7 illustrates a flap edge fence model stowed on the flap surface via an SMA torque tube employing a controller. System 700 may have common features with system 400 such as those described above in the context of FIG. 4. Accordingly, certain features, components, and functions within system 700 that are shared with system 400 will not be redundantly described here. System 700 includes, without limitation: a wing main element (not shown in FIG. 7), a flap 704, a reconfigurable flap edge fence 702 coupled to the flap 704, a shape memory alloy (SMA) torque tube 706, and a controller 708.

A shape memory alloy (SMA) is a metal that remembers its original shape after being deformed from that original shape. SMA returns to its original shape when it is heated (shape memory effect) or when the deforming pressure is removed (superelasticity). A two-way SMA remembers two different shapes: one shape at a relative low temperature, and another shape at a relative high temperature. Setting the two shapes by thermo-mechanical processing is known as "training" the SMA. An SMA with the two shapes set is known as a "trained" SMA. The shape properties of a trained SMA result from temperature initiated martensitic phase transformation from a low symmetry (martensite) to a highly symmetric (austenite) crystal structure. The temperatures at which the SMA changes its structure depend on the particular alloy, and can be tuned by varying the chemical mix and thermo-mechanical processing. Some common SMA alloys are copper-zinc-aluminum; copper-aluminum-nickel, nickel-titanium-platinum, nickel-titanium-palladium, nickel-titanium-hafnium and nickel-titanium (NiTi or Nitinol). NiTi SMA alloys generally have superior mechanical properties to copper-based SMAs, but are also generally more expensive. Any of these, and possibly other, shape memory materials can be utilized in the various embodiments described here.

Figure 9:
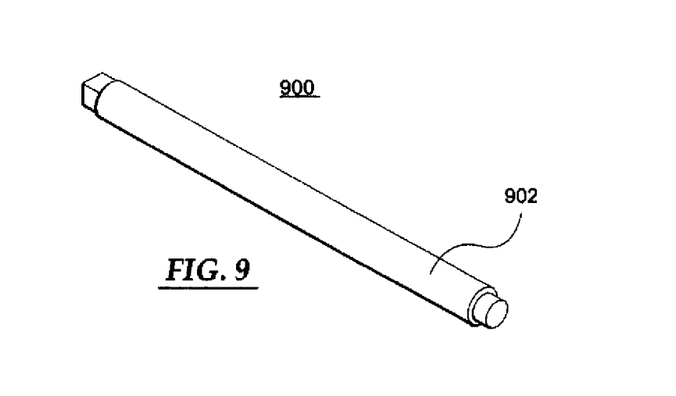
FIG. 9 is a side view that illustrates an SMA torque tube.

SMA torque tube 706 is coupled to the flap edge fence 702 and the flap 704 (similarly, the SMA torque tube 706 may be coupled to the flap edge fence 502/602 and the flap 506/606 respectively) and is configured, as shown in FIG. 7, to shape and position the generic flap edge fence 702 into a stowed position or, as shown in FIG. 8, shape and position the generic flap edge fence 802 (or flap edge fence 502/602) into a deployed position, in response to a temperature change. The temperature change may be, without limitation, the change in ambient temperature with altitude, or a temperature change that is actively adjusted by the controller 708. In this regard, under a first temperature change the SMA torque tube twists and generates a moment between the flap 704 and the flap edge fence 702 with sufficient torque to thermally deploy the flap edge fence 702 for approach and landing. Under a second temperature change, the SMA torque tube 706 thermally deactivates and returns to its martensite shape which allows the flap edge fence 702 to stow on the flap 704 for cruise. Alternatively the austenitic and martensitic shapes can be reversed (ie austenitic at cruise to stow and martensitic at landing to deploy, however this requires power). Generally, the adjustable temperate range may be about −50° C. to 25° C. For landing and approach conditions, the control temperature may be from about −10° C. to about 55° C. For cruise conditions the control temperature may be from about −70° C. to about −40° C. The SMA torque tube may be made from any of the materials identified above. In certain embodiments, the SMA torque tube is formed from a material in the family of titanium-nickel alloys that have shape memory and superelastic properties. FIG. 9 shows a side view of an SMA torque tube 902. In practice, the SMA torque tube 900 may be, without limitation, about 10 inches in length, about 0.25 inches in diameter, and about 0.05 inches in thickness.

In practice, a lock mechanism (not shown in FIG. 8) may be employed to hold the flap edge fence 702/802 (or flap edge fence 502/602) in a deployed or a retracted position. In this regard, the flap edge fence 702/802 is designed to stay stowed during take-off and cruise, and deploy during descent before approach. A lock mechanism may be employed to maintain the stowed position until triggered by temperature or altitude during descent. When triggered the lock releases the deployable flap, which moves to its landing configuration. On the ground the temperature causes the flap edge fence 702/802 to change shape, stow itself, reengage the lock, and be prepared for another deployment cycle.

The controller 708 may be implemented as part of the aircraft system, a centralized aircraft processor, a subsystem computing module devoted to the flap edge fence 704 arrangement, or the like. In operation, the controller 708 may control the flap edge fence 406 by monitoring the temperature of the SMA torque tube and by heating and/or cooling the SMA torque tube as needed. The heating/cooling of the SMA torque tube may be provided by, without limitation, the aircraft cooling/heating systems and the like. For example, the heater may utilize an electrical heater element and a controllable current source where the temperature is proportional to the current applied to the heater element. In this regard, the controller 708 determines a temperature based on a current flight condition, and provides heating/cooling to activate/deactivate the SMA torque tube as explained above. This enables the controller 708 to control the actuation of the flap edge fence 702 in accordance with the current flight conditions, e.g., whether the aircraft is approaching, landing, or in cruise. Any actuator known to those skilled in the art may be used for actuation of the flap edge fence, for example, without limitation, a hydraulic actuator, a piezoelectric actuator, a spring loaded mechanism tied to flap and the like.

The SMA torque tube 706 is controlled based on the predetermined deployment angle of the flap edge fence 702 as a function of temperature corresponding to various flight conditions. For example, the deployment angle for landing may be, without limitation, about 90 degrees at about 0° C.

Figure 10:
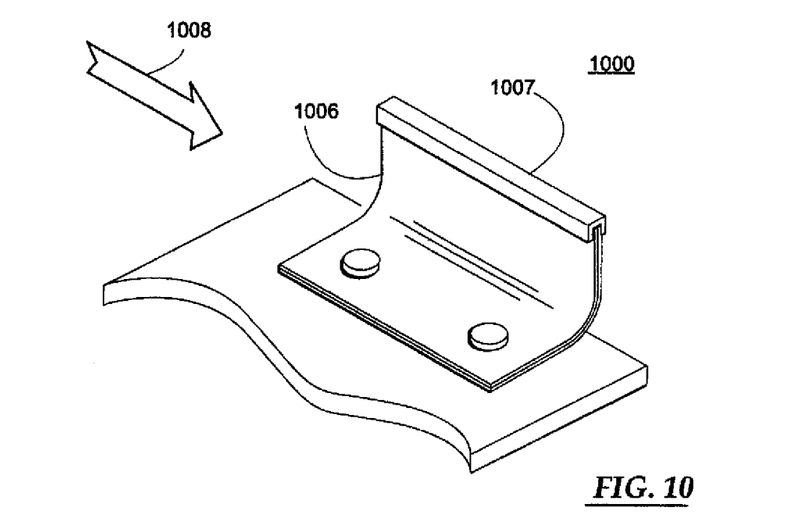
FIG. 10 is a perspective view that illustrates a deployed SMA flap edge fence model.
Figure 11:
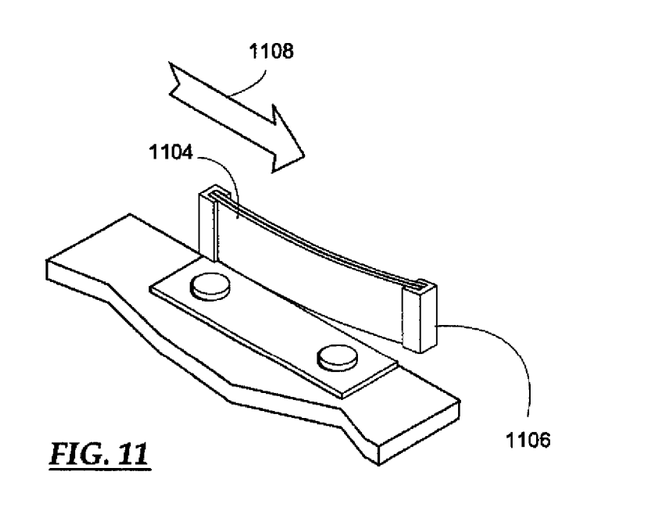
FIG. 11 is a perspective view that illustrates an SMA flap edge fence model that is stowed along the direction of the streamlined air flow.

In certain embodiments, the flap edge fence 406 itself is made of SMA, and it is suitably configured to bend and shape-shift in response to temperature change. The temperature change may be, without limitation, the change in ambient temperature with altitude, or a temperature change that is actively adjusted by a controller as described in the context of FIG. 7 above. FIG. 10 shows a perspective view that illustrates a deployed SMA flap edge fence 1006 model that is substantially parallel to the direction of the airflow 1008. FIG. 11 is a perspective view that illustrates an SMA flap edge fence 1104 model that is stowed along the direction of the air flow 1108. SMA flap edge fence 1104 is thermally stowed along the direction of streamlined air flow 1108 so that at cruise conditions (where temperatures are relatively low) drag due to the angle between the direction of the streamlined airflow and the position of the SMA flap edge fence 1104 is minimized. In another configuration, a SMA flap edge fence 1104 is deployed during takeoff and landing (where temperatures are relatively high). Springs 1007/1106 provide a "restoring force" so that when the SMA is martensitic, the flap edge fence will move to its second shape. The springs 1007/1106 are not necessary if the two-way SMA is employed. In this regard, the SMA flap edge fence 1104 is thermally deployed at a predetermined bending angle at a temperature range corresponding to landing and approach flight conditions. For example the bending angle may be, without limitation, about 90 degrees for landing at about 0° C. A flap edge fence 1006/1104 may be of various shapes and sizes and may be mounted at various chordwise locations near the tip of the flap as explained in context of FIG. 4 above or on other high lift devices (such as slats).

Figure 12:
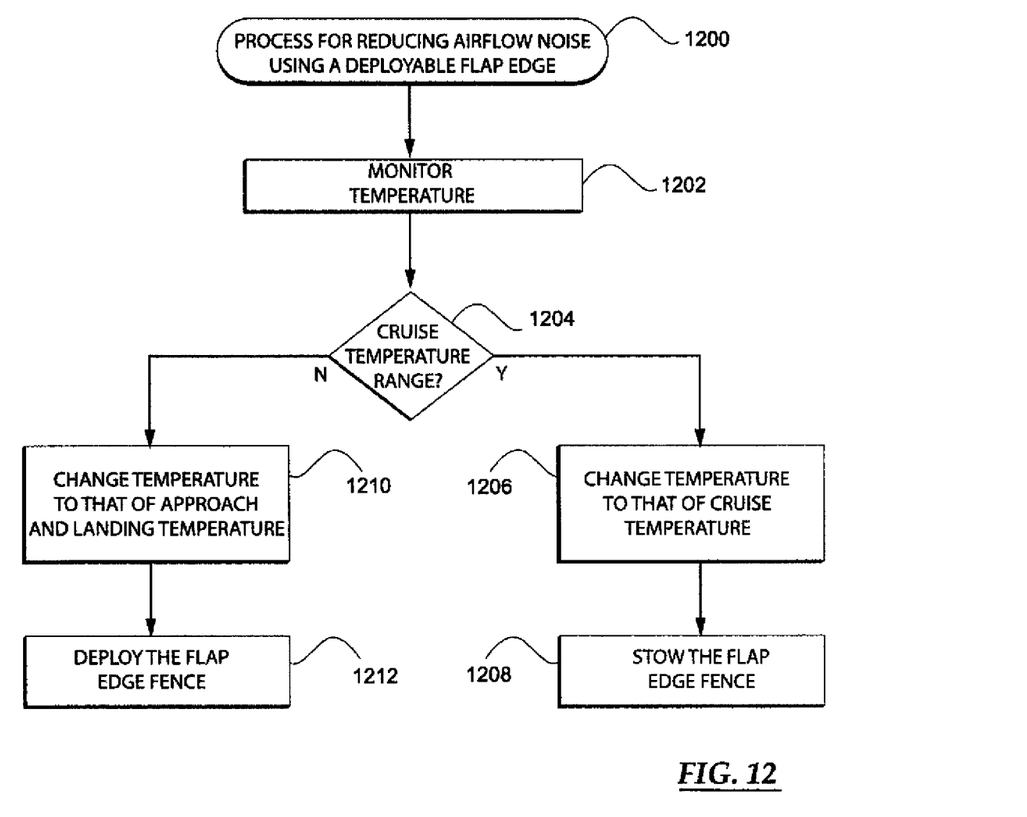
FIG. 12 is a flow chart illustrating a process for reducing airflow noise using temperature changes to operate a deployable flap edge fence.

FIG. 12 is a flowchart illustrating a process 1200 for reducing airflow noise using a deployable flap edge fence that may be performed by systems 400-1100 as described above. Process 1200, monitors the temperature, determines a temperature range for a specific flight condition, and deploys or stows the flap edge fence based on the temperature range. The various tasks performed in connection with process 1200 may be performed by software, hardware, firmware, or any combination thereof. For illustrative purposes, the following description of process 1200 may refer to elements mentioned above in connection with FIGS. 4-11. In practical embodiments, portions of process 1200 may be performed by different elements of system 400 and system 700 for reducing airflow noise, e.g., the flap, the flap edge fence, the trained SMA torque tube and the control mechanism. Process 1200 is described in terms of one of the example embodiments described herein, namely, a trained SMA torque tube to deploy the flap edge fence.

Process 1200 for reducing fluid flow noise may begin by monitoring a temperature (task 1202). Process 1200 modifies the temperature actively by a controller connected to the aircraft systems as described in the context of FIG. 7 above, or alternatively may use the ambient temperature to change the temperature of the SMA torque tube at various flight conditions. In practice, the SMA torque tube remembers its original shape after being deformed from that original shape. In this regard, the SMA torque tube returns to its original shape when it is heated or when the deforming pressure is removed. As mentioned above, a two-way SMA remembers two different shapes: one shape at a relative low temperature, and another shape at a relative high temperature. Setting the two shapes can be accomplished by thermal-mechanically "training" the SMA. In this regard, for example, the SMA torque tube can be trained to remember various twisting positions corresponding to various shapes/position of the deployable flap edge fence suitable for reducing noise and associated drag for a range of flight conditions such as cruise and landing. These properties result from temperature initiated martensitic phase transformation from a low symmetry (martensite) to a highly symmetric (austenite) crystal structure. As mentioned above, in certain embodiments, the SMA torque tube is formed from a material in the family of titanium-nickel alloys that have shape memory and superelastic properties.

In this regard, if the flight condition corresponds to the cruise temperature range (task 1204), then the temperature of the trained SMA torque tube is changed to that of the cruise condition (task 1206), and the trained SMA tube is thermally deactivated to return to its martensite shape which allows the flap edge fence to stow (task 1208) on the flap for the cruise flight conditions. For a cruise condition, for example, the temperature may be about −40° C.

Otherwise the method changes the temperature of the trained SMA torque tube to the temperature corresponding to the approach and landing flight conditions (task 1210), and thermally activates the SMA torque tube. In this regard, the SMA torque tube drives towards an austenitic trained shape in order to generate a moment between the flap edge fence and the flap with sufficient torque to deploy the flap edge fence for the approach and landing flight conditions. As mentioned above, in the deployed position, the flap edge fence reduces airflow noise by reducing a tip-leakage vortex, generated at the trailing edge, from rolling over from the lower surface to the upper surface of the flap. As an added benefit, lift to drag ratio during approach and landing is potentially increased. For landing and approach conditions, for example, the temperature may be about 2° C.°, and the trained SMA torque tube may generate a torque in excess of 100 in-lbs to deploy the flap edge fence by 90 degrees.

With the deployable flap edge fence as described herein, the drag due to the flap edge fence at cruise flight conditions is minimized while the airflow noise at approach and landing flight conditions is reduced.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for reducing airflow noise for an aircraft having, a wing main element, a flap coupled to the wing main element, and a flap edge fence coupled to the flap, the method comprising:

shaping the flap edge fence into a deployed shape and position for a first set of flight conditions to reduce the airflow noise; and shaping the flap edge fence into a stowed shape and position for a second set of flight conditions to reduce drag.

2. The method according to claim 1, wherein the flap edge fence is made of a shape memory alloy and is reconfigured in response to a temperature change.

3. The method according to claim 1, further comprising stowing the flap edge fence along a direction of a streamlined air flow.

4. The method according to claim 1, further comprising deploying the flap edge fence at a predetermined bending angle.

5. The method according to claim 1, further comprising thermally activating a trained shape memory torque tube, at a first temperature range, wherein the trained shape memory torque tube is configured to drive towards an austenitic trained shape in order to generate a moment between the flap edge fence and the flap with sufficient torque to deploy the flap edge fence for the first set of flight conditions.

6. The method according to claim 1, further comprising thermally deactivating a trained shape memory torque tube at a second temperature range, wherein the trained shape memory torque tube is configured to return to its martensite shape which allows the flap edge fence to stow on the flap for the second set of flight conditions.

7. A morphing fluid dynamic system for reducing drag, the system comprising:
  a body capable of generating lift by moving through a fluid, wherein the body has a trailing edge, a leading edge, a pressure side, and a suction side;
  a body edge fence coupled to the trailing edge and the leading edge; and
  a control mechanism for the body edge fence, the control mechanism being configured to:
    morph the body edge fence into a deployed state for a first set of operating conditions; and
    morph the body edge fence into a stowed state for a second set of operating conditions.

8. The system according to claim 7, wherein:
  the control mechanism is configured to deploy the body edge fence into a deployed shape and position that reduces fluid flow noise by impeding tip-leakage vortices, generated at the trailing edge, from rolling over from the pressure side to the suction side; and
  the control mechanism is configured to stow the body edge fence into a stowed shape and position that reduces drag by reducing interaction of the body edge fence with a local fluid-flow over the body.

9. The system according to claim 7, further comprising a trained shape memory torque tube coupled to the body edge fence and to at least one of the edges of the body, and configured to change the position of the body edge fence in response to temperature, wherein the trained shape memory torque tube is:
  thermally activated at a first temperature range to drive towards an austenitic trained shape, generating a moment between the body edge fence and the body with sufficient torque to deploy the body edge fence for the first set of operating conditions; and
  thermally deactivated at a second temperature range to return to its martensite shape which allows the body edge fence to stow on the body for the second set of operating conditions.

10. The system according to claim 7, wherein the body edge fence is made of a shape memory alloy and is configured to:
  thermally deploy at a predetermined bending angle at a first temperature range for the first set of operating conditions; and
  thermally stow along a streamlined fluid flow at a second temperature range during the second set of operating conditions.

* * * * *